Nov. 13, 1962  R. B. STELZER ETAL  3,063,150
RECORD TRANSLATING APPARATUS
Filed July 22, 1959  4 Sheets-Sheet 2

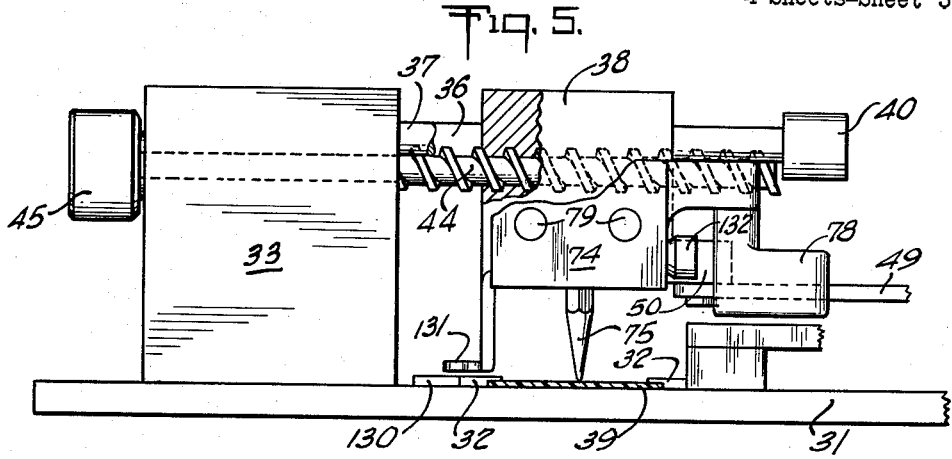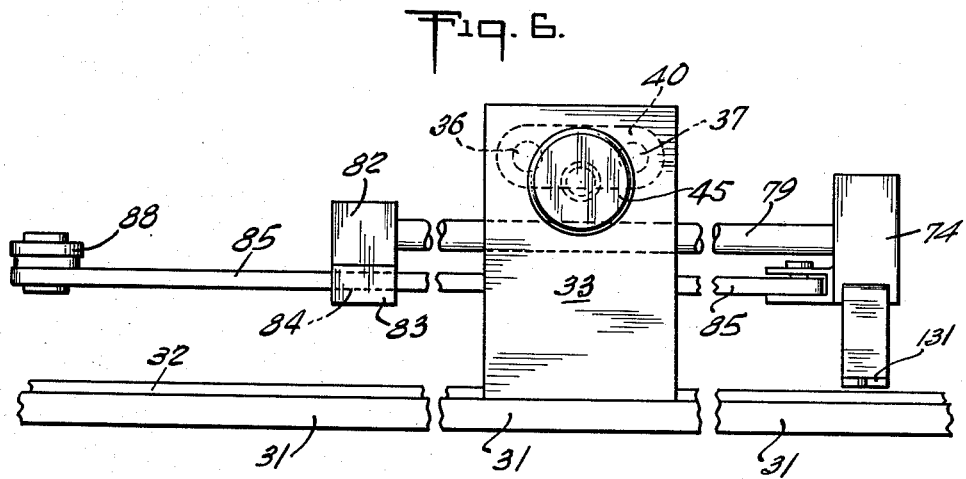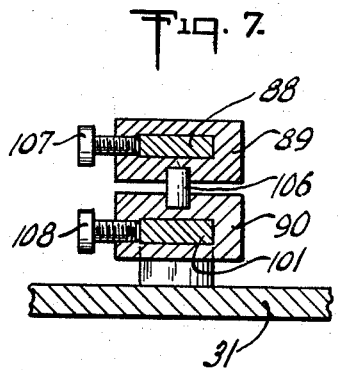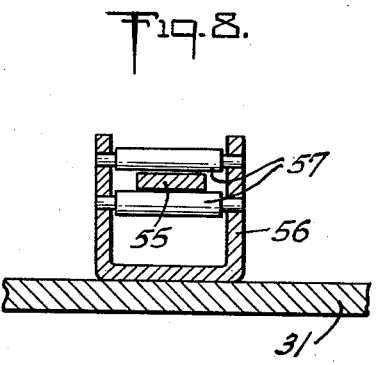

Nov. 13, 1962     R. B. STELZER ETAL     3,063,150
RECORD TRANSLATING APPARATUS

Filed July 22, 1959     4 Sheets-Sheet 4

United States Patent Office 3,063,150
Patented Nov. 13, 1962

3,063,150
RECORD TRANSLATING APPARATUS
Roland B. Stelzer, Bellaire, and George J. Grossman, Jr., and Robert B. Heath, Houston, Tex., assignors to Texaco Inc., New York, N.Y., a corporation of Delaware
Filed July 22, 1959, Ser. No. 828,870
2 Claims. (Cl. 33—23)

This invention is concerned with pantograph type apparatus for use in translating a record to change the scale or scales thereof. More specifically, the invention concerns apparatus for translating a record that has a time base along one dimension, and providing a record that has a displacement base along the corresponding dimension.

In oil well logging operations there is a problem concerned with the fact that the logging records that are made by means such as the so-called logging-while-drilling method, are recorded with the longitudinal dimension of the record being in terms of time, so that the distance scale of the recorded data varies depending upon the rate of penetration of the drill. In order to correlate the data thus recorded (with a time base record) with the records made where a logging tool is separately run into the well and the longitudinal scale is directly calibrated in terms of distance or displacement; it is most helpful to translate the time scale of the former type of record into a displacement scale that will match the displacement scale of the latter type of record. Such correlation between records is valuable in making a complete survey to determine different characteristics of the formations that are traversed by the two types of logs, in direct comparison with one another.

It is pointed out that where a record is taken such that the time element is the basis for a dimension of the record, and the penetration rate of the instrument that is logging the data in the hole is variable; the displacement or distance that is covered by the record along such time base will vary depending upon the rate of penetration. Under these circumstances the translation of the time based record to provide a record having a constant displacement scale base along the corresponding dimension thereof, must involve a variable change in the ratio of the displacement along the record as it is translated from the time base record to a corresponding displacement base record.

It is an object of this invention to provide an improved record translating apparatus.

It is another object of this invention to provide a record translating apparatus that is particularly adapted for translating one type of down hole record (e.g. that is made in connection with drilling operations of oil wells) to be directly correlatable with the more standard type of record that is made by running a logging tool down a drilled hole, for recording data in connection therewith.

Still another object of this invention is to provide apparatus for translating a record that has a variable scale along one dimension thereof, into a record that has a fixed scale along the corresponding dimension and simultaneously to enlarge the transverse dimension of the first record.

Briefly, the invention may be described as apparatus for translating a record having a time base along one dimension, into a record having a displacement base along the corresponding dimension. Such apparatus includes means for simultaneously enlarging the first named record along the dimension transverse to the said one dimension. The apparatus comprises in combination a record strip for receiving said translated record, and means for tracing the translated record onto said strip. The apparatus also comprises means for following the first named record, first pantograph linkage means for transferring movements of said following means in one dimension of said first named record to said tracing means, and second pantograph linkage means for transferring movements of said following means in the other dimension of the first named record to said record strip.

The foregoing and other objects and benefits of the invention will be made more clear in connection with the detailed description which follows, and which is illustrated in the drawings in which:

FIG. 5 is an enlarged fragmentary side (left-front) elevation partly broken away to show interior structure and illustrating the record following pointer and its supporting means;

FIG. 6 is another enlarged fragmentary elevation taken from the left end of the apparatus when viewed as illustrated in FIG. 1, and showing the same elements as those illustrated in FIG. 5;

FIG. 7 is an enlarged detail cross section, taken along the line 7—7 of FIG. 1 and looking in the direction of the arrows;

FIG. 8 is another enlarged detail cross section, showing the roller support, and taken along the lines 8—8 of FIG. 1;

Figure 1:
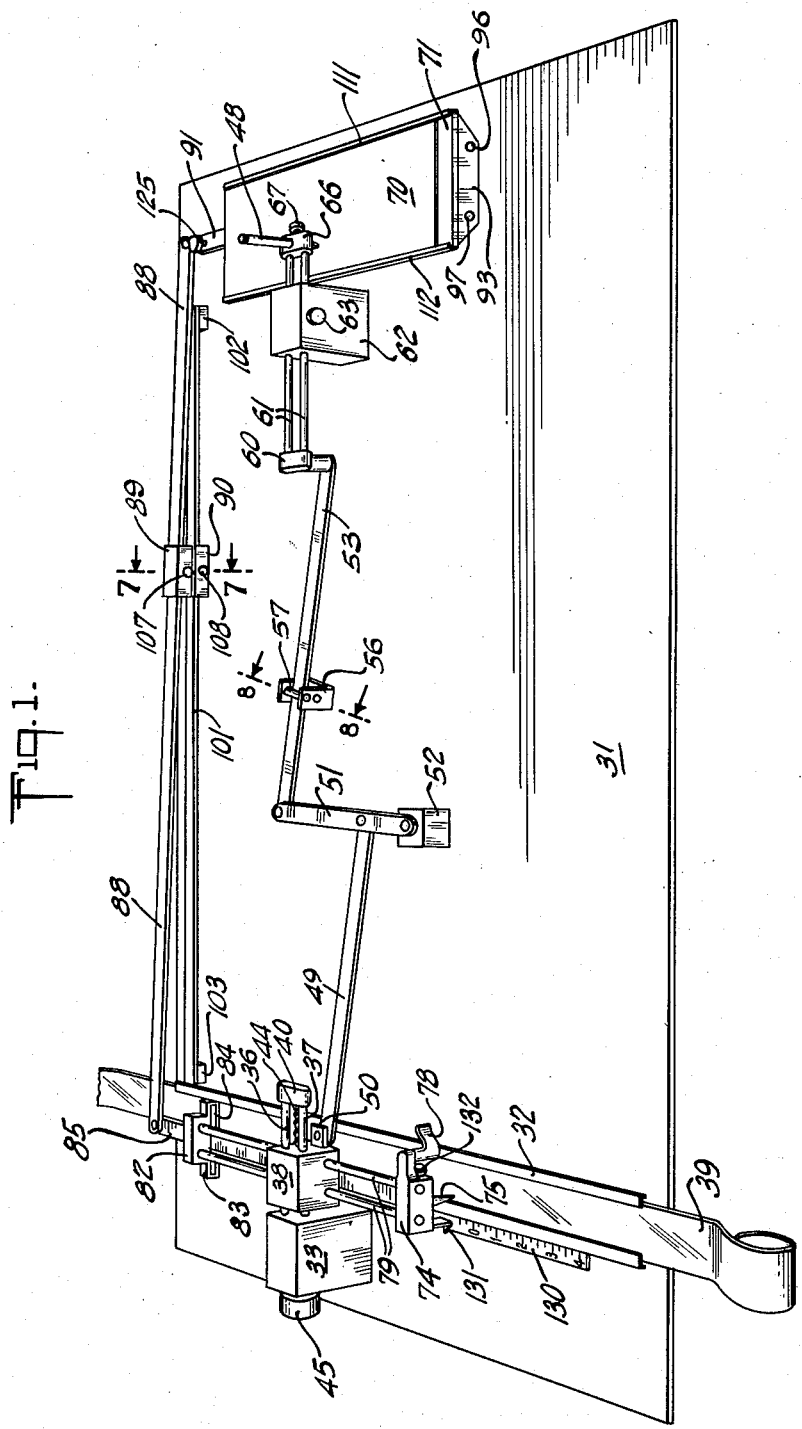
FIG. 1 is a perspective view of the apparatus in accordance with a preferred embodiment of the invention.

It will be understood that although the apparatus according to this invention is here illustrated in connection with a particular application thereof, the invention may have other and wider applications, e.g. making use of the same properties in other fields. However, a preferred embodiment of the invention is illustrated in the drawings, and is described in connection with its application to the use of translating oil well logs of one type into logs that are directly correlatable with other oil well logs which are made by a different procedure.

Figure 2:
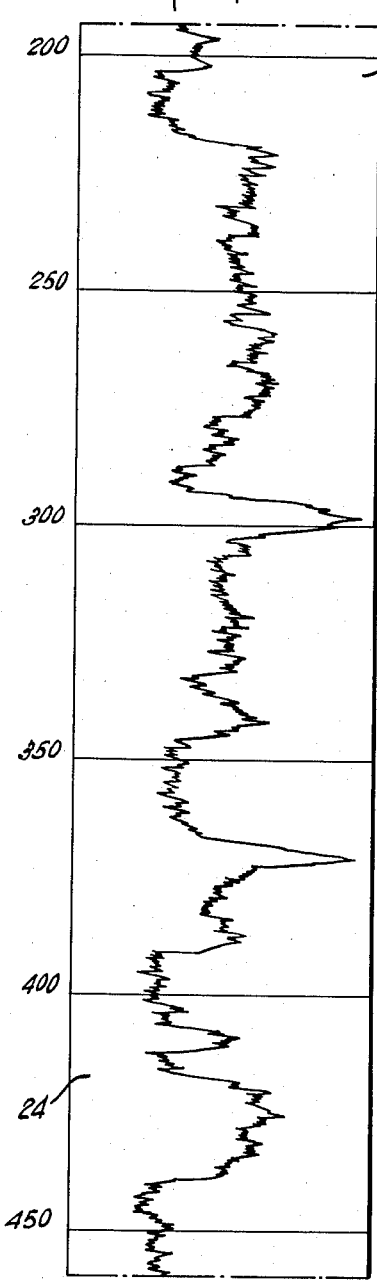
FIG. 2 illustrates a conventional gamma ray log having a fixed scale displacement base, along the longitudinal dimension thereof.
Figure 3:
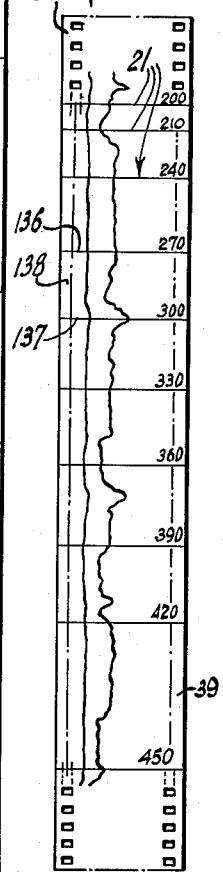
FIG. 3 illustrates a record made with a time base along the longitudinal dimension thereof, which simulates a log taken while drilling.
Figure 4:
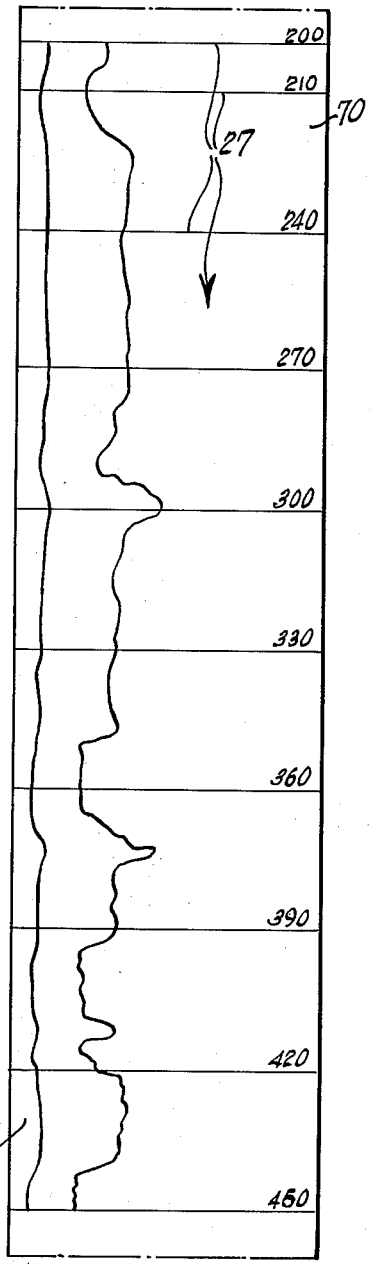
FIG. 4 illustrates a translated record made from the log record as shown in FIG. 3, and shows the direct correlation that may be had with the conventional record illustrated in FIG. 2.

For example with reference to FIGS. 2, 3 and 4, it is pointed out that the FIG. 3 record illustrates a section of a gamma ray log that was made on equipment which is normally employed so as to make such log during the drilling procedure. Such logging while drilling procedure involves the use of a thirty-five millimeter film strip 39 which is driven at a certain predetermined rate during the recording procedure, which rate remains constant with respect to time. The illustrated record strip was made in a test hole to simulate conditions while a hole was being drilled from somewhere around the 200 foot depth, to past the 450 foot level of the hole. During the drilling of this depth of hole, the penetration rate would have varied, as is invariably the case with actual drilling. Consequently, when the time was correlated with the depth "made" in the hole, a series of depth lines 21 were marked, as is indicated on the FIG. 3 illustration. From such marking, it will be observed that the displacement scale of record, on strip 39 varied as the various depths of the hole were drilled. It may be noted that the depths indicated on the lines 21 are mostly at thirty foot intervals. This is because thirty foot drill stem pipes were employed; and the time of adding a new section of such pipe is the most convenient point to pick on the record from an actual drilling operation. It will be understood that the record is photographic, and is made down hole in a capsule structure that would be located near the drill bit so that a strip of film would be removed and developed each time the bit was pulled out of the hole for replacement.

In contrast with the foregoing logging while drilling record, the record which is made with a conventional gamma ray logging tool (that is run into the hole after it has been drilled) looks like the FIG. 2 illustration. It provides a record strip 24 that has a constant displacement scale along the entire length of the record. In addition, the width of the record strip 24 is three times that of the effective width of a thirty-five millimeter film strip record, e.g. record strip 39 that was made by the logging while drilling tool.

There are many occasions when it is helpful and important to make a comparison and/or a correlation between a record obtained with a time base, such as the FIG. 3 type record; with a record like that illustrated in FIG. 2, where the scale is larger in a transverse direction and is constant and in accordance with displacement in the longitudinal direction. By employing apparatus according to the invention, a translated log may be made from the record as it exists in accordance with a FIG. 3 type, to a record like that illustrated in FIG. 4 which may be directly compared with the other or conventional type record such as that illustrated in FIG. 2. Thus, it will be observed that a record strip 70 is illustrated in FIG. 4, which has depth lines 27 marked thereon that correspond in depths to lines 21 of the strip 39 shown in FIG. 3. However, it will be observed that the longitudinal scale has been translated so as to make it constant in accordance with displacement, and to the same scale as the conventional record on strip 24 that is illustrated in FIG. 2. One embodiment of apparatus for carrying out such a translation is illustrated in FIG. 1 and FIGS. 5 through 12.

Referring to FIGS. 1 and 5 through 12, it will be observed that there is a base 31 that has mounted thereon a record strip holder 32 that is solidly attached in fixed relation to the base 31. There is a pointer apparatus supporting block 33 that is also securely mounted in fixed relation to the base 31. Block 33 has two cross supporting and guide rods 36 and 37 that act to slideably support and guide a supporting block 38, for movement thereof transversely across the width of the record strip holder 32 and a record 39 which may be in place therein. Attached to the free ends of the rods 36 and 37, there is a stop member 40 that acts to limit the movement of the block 38 along the rods 36 and 37.

For sliding the block 38 along the rods 36 and 37 there is a worm shaft 44. The worm shaft 44 is attached to a knob 45 for rotating the worm shaft and thus positioning the block 38 along the rods 36 and 37.

The movements of the block 38 are transferred to a tracing pen 48 by means of a pantograph type linkage that includes a link 49, which is pivotally attached at one end thereof to a lug 50 that extends from the lower portion of the block 38. The other end of the link 49 is pivotally attached to a lever 51 as illustrated, while one end of the lever 51 is pivotally attached to a fulcrum block 52 that is securely attached to the base 31.

At the free swinging end thereof, lever 51 is pivotally attached to another link 55 that is vertically supported by a roller supporting bracket 56. Bracket 56 is a U-shaped strip that is fastened securely onto the base 31 and that has a pair of rollers 57 which support the link 55 therebetween, for free longitudinal movement of the link. Rollers 57 are, of course, freely rotatable about their longitudinal axes by being journaled in the bracket 56.

Pivotally attached at the other end of the link 55 from that where it is attached to lever 51, there is a T-shaped coupling member 60 that has attached thereto, in a secure and fixed manner, a pair of rods 61. Rods 61 pass through a supporting block 62, that is securely attached to the base 31. The block 62 holds the rods 61 for free sliding longitudinal movement therethrough, and may have a set screw 63 if desired, in order to clamp one of the rods 61 against any movement; for purposes of transporting the entire instrument.

At the free ends of rods 61 there is a supporting lug 66 which is adapted to hold the tracking pen 48 therein. Like the coupling member 60 at the other end of rods 61, the lug 66 is securely attached to the rods 61 in any convenient manner. On the side of lug 66 away from the block 62 there is a set screw 67 that acts to clamp and hold the body of the pen 48 in any predetermined vertical position. Pen 48 is preferably one having a spring biased writing tip, e.g. the writing point or tip is urged by a coil spring (not shown) to extend beyond the end of the pen holder, up to a fixed limiting extension.

It will be observed that the above described pantograph linkage, which includes link and lever arms 49, 51 and 55, acts to transfer the lateral movements of the block 38 to the tracing pen 48 that lies over a record strip 70 which is supported on a table structure 71. In this particular instance the linkage is designed to provide an enlargement of three times, for such lateral movements.

The longitudinal movement tracing (for following the record that is on record strip 39) is carried out by moving a pointer supporting lug 74 longitudinally over the record strip 39. There is a curve-following pointer 75 that is securely attached to the lug 74, and that extends down into close proximity with the surface of the record strip 39. Lug 74 has an extended portion to the right (as viewed in FIG. 1) which has attached thereto a finger tab 78 that is for the operator to grasp in moving the pointer 75 longitudinally while following a curve on the film or record strip 39.

Lug 74 is attached to the ends of a pair of longitudinally extending rods 79 for support thereby. The rods 79 are in turn supported by, and pass slideably through, the block 38.

Now, it will be observed that the longitudinal movements of pointer 75 are directly controllable by the finger tab 78, while the lateral movement of the same pointer 75 may be controlled by thumb knob 45 since the lateral movement of the block 38 will correspondingly move the pointer 75.

At the other end of the rods 79, there is a bracket 82 that has the rods 79 securely attached thereto. Bracket 82 also incorporates a lever supporting slot structure 83, which forms a slot 84 below the solid portion of the bracket 82. Passing through the slot 84 there is a link 85 that is pivotally attached at one end thereof to the pointer supporting lug 74.

Pivotally attached to the free end of the link 85 there is a lever 88 that passes through the upper one of a pair of pivot blocks 89 and 90, while it is pivotally attached at the other end thereof to another link bar 91. Link bar 91 in turn, is pivotally attached at its other extreme to the table structure 71 by means of a lug 92 (FIG. 10) that is attached to an end piece 93 of the table 71.

Figure 9:
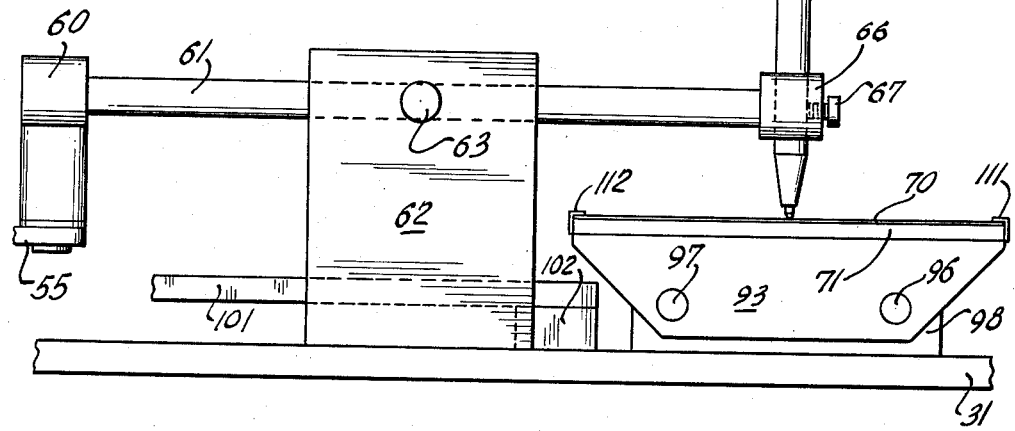
FIG. 9 is an enlarged fragmentary side (right-front) elevation, showing the tracing pen and the table for supporting the record strip upon which the translated record is placed, plus the surrounding structures.
Figure 10:
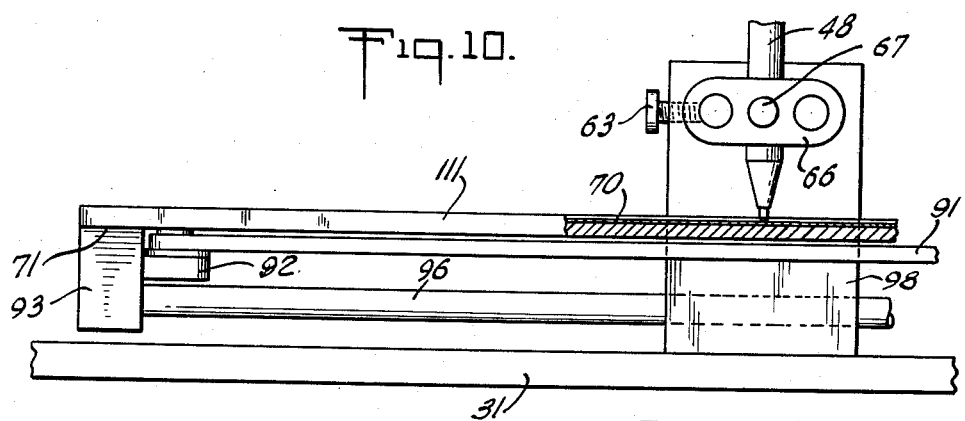
FIG. 10 is an enlarged fragmentary elevation, partly broken away in cross section and taken from the right end when viewed as shown in FIG. 1.

It may be noted at this point, that the table 71 is fastened to the base 31 by means of a pair of longitudinally extending rods 96 and 97 (FIGS. 9 and 10). Rods 96 and 97 are parallel to one another and pass slideably through a support block 98 that is securely attached to the base 31. Consequently, it will be noted that the table structure 71 is attached to allow free longitudinal movement of the table (and the record strip 70) but no other movement thereof relative to the base 31. Furthermore it will be observed that such longitudinal movement of table structure 71 is created by, or controlled from, the longitudinal movements of pointer 75 (and connected structure) as determined by the lever and linkage connections just described above.

In addition, the ratio of longitudinal movements that will exist between the movement of pointer 75, and those created by the table structure 71, may be predetermined and adjustably set by positioning the pivot blocks 89 and 90. This will be understood with reference to the structure of the pivot blocks in connection with FIG. 7 as well as FIG. 1. Thus, it will be observed that the lower pivot block 90 is slideably fastened on a flat bar 101, that is attached at each end thereof to the base 31 by spacing blocks 102 and 103. Therefore the position across the base 31 (along the bar 101) of the pivot blocks 89 and 90, may be slideably adjusted by moving the pivot block 90 along the bar 101. Referring to FIG. 7 it will be observed that the pivot blocks 89 and 90 are pivotally attached to one another by a centrally located pivot pin 106. In order to set the ratio of movements at a predetermined fixed point, there are a pair of set screws 107 and 108 that are threadably carried by the pivot blocks 89 and 90 respectively, and that act to make contact with the edge of the lever 88 and with the bar 101 respectively.

It will be observed that there are edge guide record holding strips 111 and 112 that overlap the edges of the record strip 70 and hold it in firm flat contact with the surface of the table structure 71.

Figure 11:
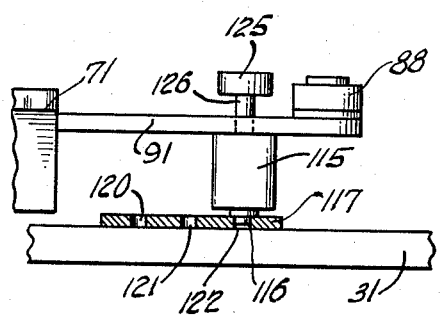
FIG. 11 is an enlarged fragmentary right end elevation, partly in cross section, showing the locking pin structure that is employed in connection with the linkage that connects to the table; and, FIG. 12 is an enlarged plan view partly broken away to show elements that are underneath others, in connection with the locking pin structure of FIG. 11.
Figure 12:
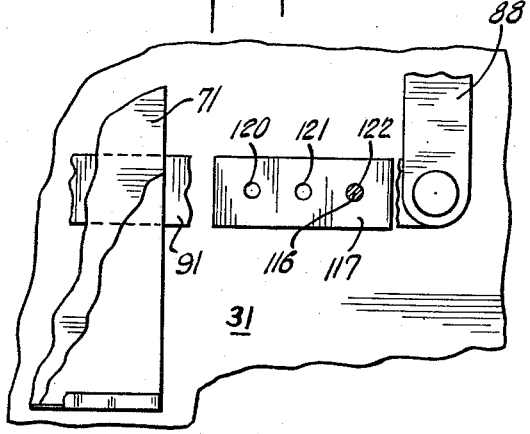

Referring to FIGS. 11 and 12 it will be observed that there is a locking pin arrangement carried by link bar 91. This structure includes a barrel structure 115 that is attached to the link 91 on the underneath side thereof, next to the base 31. This barrel 115 contains spring loading structure (not shown) for allowing a locking pin 116 to be retracted or extended from underneath the barrel 115. The locking pin 116 cooperates with a plate 117 that is fastened to the surface of the base 31. Plate 117 has three holes 120, 121 and 122 therein, that are employed for adjustment purposes to set the connecting linkage that controls the longitudinal movement of table 71, to any one of three given positions.

The retraction or extending of the locking pin 116 is controlled from the top of the barrel 115 by a thumb knob 125, and a shaft 126 that extends into the barrel 115 through the link 91. The structure for extending and retracting the locking pin 116, that is within the barrel 115, may take any feasible form and forms no part per se of this invention.

Referring to FIG. 1, on the left hand side thereof, it is pointed out that there is a fixed scale 130 that is firmly attached to the base 31 alongside of the outer record strip holder 32. This scale 130 is marked off with a zero at the center and indicates four inches either side thereof, so that the total span is eight inches. This is substantially the full travel distance that pointer 75 may traverse for a single tracing operation. It will be observed that there is an additional, auxiliary pointer 131 that extends transversely relative to pointer 75, close above the scale 130 so as to be in indicating position therewith. This auxiliary pointer 131 is supported from the pointer support lug 74, transversely in line with pointer 75. Pointer 75 is adjustable transversely across the record strip 39 by means of a thumb screw or knob 132. This adjustment is for the purpose of setting the pointer 75 at its zero point (transversely) when the pen 48 is over the zero line on the other record strip 70.

*Operation*

To understand the mechanical procedure involved in making the pantograph copy of a film strip record, it will be helpful to review the basis or background involved in making the transformation from a film strip time based record to the transformed pantograph, depth record. On the time based record strip, particular steps may be recognized by correlation of this record with the driller's log, by reason of the time involved in changing the drill step connections as new sections of drill pipe are added. These depth points are marked on the record strip as shown in FIG. 3 (see lines 21); and in each case it is helpful to make an indication mark at the mid point between successive ones of the depth points. Now as will be readily observed, the depth indications vary in the distance apart on the film strip (time scale) of FIG. 3. Therefore, in order to transform this record to a predetermined distance scale that remains constant, each section of drill stem distance on the time based record strip of FIG. 3 is transformed with the proper ratio, so as to make the distance on the time base film strip come out to a given scale distance on the pantograph record.

The transformation is carried out individually for each of the distances that are marked on the film strip, and that represent thirty feet in the illustrated case, because in the illustrated film strip record the drill stem sections were thirty feet long. It will be observed that the ratio of transformation may vary all the way from expansion to contraction, and must be set to a different ratio for each thirty foot section of travel.

The operation of the apparatus will become amply clear on a description of the operation involved in connection with a given section of drill stem penetration that is indicated on the film strip record. For example, take the film strip record illustrated in FIG. 3, at the section thereof between a line 136 that represents the 270 foot depth, to another line 137 that represents the 300 foot depth. It will be noted that there has been drawn also on the film strip a mid point mark 138 between the lines 136 and 137.

Referring to FIG. 1 again, the procedural steps involved in tracing a thirty foot section of record 39 onto the record strip 70 may be followed in accordance with the following: The first step may be that of inserting a pantograph record strip 70 onto the table 71 under the guide strips 111 and 112 on the table 71 after the table 71 has been moved and locked into its starting position for tracing a record to the conventional distance scale of about 1.6 inches equals thirty-two feet. The latter is accomplished by turning the knob 125 a quarter turn to lift the locking pin 116 out of the hole 122, and then after moving the table 71 downward (as viewed in FIG. 1) by releasing the locking pin 116 again and allowing it to fall into the hole 120 for setting this starting position. Then, with the tracing pen 48 set down close to the paper of record strip 70, the record strip will be shifted until the depth line 27 (FIG. 4) at 270 feet lies directly under the tracing pen 48. This sets the starting point with respect to the record strip 70 relative to the table 71, and therefore some tape may be employed to hold the record strip 70 in place as thus adjusted.

Now, moving to the other side of the apparatus the film strip 39 may be inserted into its holder 32 and slid longitudinally into position such that the center mark 138 (FIG. 3) is lined up a short distance (⅕ of the linear distance between line 136 and center mark 138 on the film strip 39) above the zero line on the scale 130. The reason for setting this center mark above the zero line is that the location of the hole 120 is set up for providing a transformation for thirty-two foot lengths of drill pipe. Consequently, when the drill pipe is thirty feet, or thirty-one feet, an adjustment must be made so that the distance from the beginning depth line that is to be traced (i.e. the 270 foot line 136 on FIG. 3) to the zero line on the scale 130 will represent sixteen feet irrespective of the fact that the mid point on record 39 only represents fifteen feet.

After the film strip 39 has been thus set relative to the base 31 it may be secured in position by using strips of tape. Then, if record strip 70 has been prepared with a line depicting zero transverse deflection, tracing pen 48 may be moved to said line by means of knob 45; and then pointer 75 should be adjusted to the zero transverse deflection line of film strip 39, by means of knob 132

Now the longitudinal scale ratio adjustment is made with the table 71 still locked in its starting position, by loosening the set screws 107 and 108 on the pivot blocks 89 and 90, and sliding the pivot blocks across the base 31 (along the bar 101) until the position of the pointer 75 lies directly over the starting line 136 of this particular section of film strip that is to be transcribed. After this adjustment has been made, the set screws 107 and 108 should be tightened to hold the pivot at this location. Then the locking pin 116, that holds table 71 set in its starting position, may be released by turning the knob 125 a quarter turn so as to lift the locking pin 116.

Then, the actual tracing of one of the traces on the film strip 39 may be carried out. First recording pen 48 is moved down to place its tip in spring biased contact with the surface of the record strip 70 on table 71. This placing of tracing pen 48 into contact with the record strip 70 will be done with pointer 75 lying directly over the trace that is to be copied from film strip 39. Now, the trace is followed by placing one hand on the knurled knob 45, with the other hand grasping the finger tab 78. Then as the pointer support lug 74 (by means of tab 78) is drawn downward longitudinally with a steady motion, the pointer 75 is kept in close following position over the trace on film strip 39 by turning the knob 45.

It will be observed that as the pointer 75 is moved downward, when viewed as shown in FIG. 1, over the surface of the film strip 39, the table 71 on the other side of the base 31 is correspondingly moved upward at a ratio of movement that is dependent upon the adjusted position of the pivot blocks 89 and 90. Consequently, the longitudinal position of pointer 75 is reproduced with an enlargement, or a reduction, or a 1:1 ratio, by the pen trace caused by relative movement of the tracing pen 48 over the surface of the record strip 70 that is attached to the table 71. At the same time the pointer 75 is maintained over the trace that is being followed on the record film strip 39 by rotation of the knob 45. Such rotation of knob 45 moves the pointer 75 transversely across the film strip 39 to keep the pointer over the trace that is being followed; and as such transverse movement takes place, the fixed ratio pantograph linkage that connects block 38 with the tracing pen support lug 66, causes the lateral (or transverse) movements to be reproduced at a one to three enlargement on the record strip 70.

Thus, after a given section of the record on film strip 39, e.g. the thirty foot section between lines 136 and 137 on FIG. 3, has been entirely traced by the movement of pointer 75 thereover; the same curve is reproduced enlarged laterally and according to the proper longitudinal ratio, on the record strip 70, e.g. the strip illustrated in FIG. 4. This reproduced portion is that between the corresponding depth points on the record, i.e. between 270 feet and 300 feet on the FIG. 4 illustration.

When the bottom of the section of curve on film strip 39 has been reached, the tracing pen 48 will be lifted. Then the procedure will be repeated starting from the top of the other curve on film strip 39 and proceeding down again to the bottom of the section to be reproduced, as before.

It is pointed out that the procedure employed with the apparatus of this invention involves the use of an average rate of penetration from one section of drill pipe to the next. Such averaging is provided by the use of the mid point between depth markings on the film strip record, as the basis for determining the longitudinal scale factor in connection with the tracing. If it should be clear that there was a large change in the penetration rate during the drilling with one section of drill pipe, this section could be divided into parts so that the longitudinal scale ratio might be changed to suit each part for improving the accuracy of the results.

It will be clear that each length section, e.g. thirty feet of penetration that is reproduced from the film strip time base record to the pantograph displacement scale record; will be carried out one length section at a time, and the resulting pantograph record provides a transformed showing of the time based record in terms of constant displacement over the depth penetrated and recorded. In this manner the pantograph record reproduction is directly comparable with an ordinary log record that has been run in a well after the well has been drilled and wherein the displacement scale is constant throughout the record. This means that a direct comparison may be made with the two records placed side by side, and no errors are involved in the need for determining the transposition from an unequal or variable displacement scale to a constant conventional one.

It is pointed out that the three locking adjustment holes 120, 121 and 122 that act in connection and cooperation with the locking pin 116 on the lever arm 91 of the table 71, are used for the setting up and adjusting of the instrument in use, as has been indicated above. Also, it may be noted that the hole 122 is used additionally as a locking point for holding the parts rigid in connection with transporting the apparatus. The hole 121 is employed for use with transposing a section of film strip record, where the length of the section being transposed is physically (on film strip 39 itself) greater than eight inches, and may be up to sixteen inches. When this is the case, the procedure is similar to that for a section that is eight inches or less, but involves a repetition of the procedure, or a breaking of the section to be traced into two parts. Thus, it will be noted that the first half of a section that is between eight and sixteen inches long would be set up with its mid point opposite the zero mark on the scale 130 (or a little above for a thirty or thirty-one foot distance) and then this half traced in the usual manner after having set up the ratio at the beginning with the locking pin in the hole 121. Now after this half has been traced, it will occupy only half the conventional scale distance on the pantograph record strip 70; and then the procedure involves setting up the second half with its mid point opposite the zero mark on the scale 130 and completing the second half the same way after moving the strip 70 up to begin where the first half left off.

While a particular embodiment according to the invention has been described in considerable detail in accordance with the applicable statutes, this is not to be taken as in any way limiting the invention but merely as being descriptive thereof.

What is claimed as the invention is:

1. Apparatus for translating a first record having a variable scale along one dimension thereof into a second record having a fixed scale along the corresponding dimension and simultaneously enlarging the transverse dimension of said first named record, comprising in combination a record strip for receiving said translated record, means for tracing the translated record onto said strip, a table for supporting said record strip, said table being movable only about the longitudinal dimension thereof, said tracing means being movable only about the transverse dimension of said strip, a pointer for following the first named record, means for supporting said pointer adjacent to the record to be followed, said supporting means comprising a block supported for transverse movement only relative to said first named record, a lug carrying said pointer and being supported from said block for longitudinal movement only relative to said first named record, first lever linkage means connected between said block and said tracing means for transferring movements of said pointer supporting means in the transverse dimension to said tracing means, and second adjustable lever linkage means connected between said lug and said table for inversely transferring movements of said pointer supporting means in the longitudinal dimension to said table.

2. Apparatus for translating a first record having a variable scale along one dimension thereof into a second record having a fixed scale along the corresponding dimension and simultaneously enlarging the transverse dimension of said first named record, comprising in combination a base, a record strip for receiving said translated record, a pen for tracing the translated record onto said strip, a table for supporting said strip, table support means attached to said base and fixed relative to said first named record and supporting said table for movement only in a longitudinal direction relative to said strip, a first lug for supporting said pen, pen lug support means attached to said base and supporting said pen lug for movement only in a transverse direction relative to said strip, a pointer for following the first named record, a second lug for supporting said pointer, a block, pointer lug support means attached to said block, said block being supported for transverse movement only relative to said first named record, said pointer lug support means providing for longitudinal movement only of said pointer lug relative to said block, first lever linkage means connecting said block with said pen lug support means for transferring transverse movements of said pointer to said pen with a predetermined ratio of movements, and second lever linkage means connecting said pointer lug with said table for transferring longitudinal movements of said pointer to said table, said second lever linkage means including an adjustable fulcrum for setting the ratio of movements over a range that includes both enlargement and reduction thereof.

References Cited in the file of this patent

UNITED STATES PATENTS

| | | |
|---|---|---|
| 2,035,099 | Smulski | Mar. 24, 1936 |
| 2,553,026 | Williams et al. | May 15, 1951 |
| 2,712,694 | Herbold | July 12, 1955 |

FOREIGN PATENTS

| | | |
|---|---|---|
| 479,504 | Italy | Mar. 31, 1953 |
| 512,220 | Italy | Jan. 29, 1955 |